(12) United States Patent
Suryanarayana et al.

(10) Patent No.: US 9,300,493 B2
(45) Date of Patent: *Mar. 29, 2016

(54) METHODS AND APPARATUS TO PROVIDE PRESENCE INFORMATION

(75) Inventors: Lalitha Suryanarayana, Austin, TX (US); Michael Grannan, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/538,624

(22) Filed: Jun. 29, 2012

(65) Prior Publication Data

US 2012/0331076 A1  Dec. 27, 2012

Related U.S. Application Data

(63) Continuation of application No. 11/693,537, filed on Mar. 29, 2007, now Pat. No. 8,234,366.

(51) Int. Cl.
*G06F 15/173* (2006.01)
*G06F 15/16* (2006.01)
(Continued)

(52) U.S. Cl.
CPC .............. *H04L 12/581* (2013.01); *H04L 51/04* (2013.01); *H04L 67/24* (2013.01)

(58) Field of Classification Search
CPC ....... H04L 12/581; H04L 67/24; H04L 51/04; H04L 12/5825
USPC ................. 709/201–226, 238, 245, 249, 232; 707/501–513, 530, 535; 370/227–235, 370/352–360; 715/215, 735–740; 345/170–175

See application file for complete search history.

(56) References Cited

U.S. PATENT DOCUMENTS

| | | | |
|---|---|---|---|
| 7,035,923 B1 * | 4/2006 | Yoakum et al. | 709/224 |
| 7,233,990 B1 * | 6/2007 | Debaty et al. | 709/224 |
| 7,783,022 B1 * | 8/2010 | Jay et al. | 379/202.01 |

(Continued)

FOREIGN PATENT DOCUMENTS

| | | |
|---|---|---|
| WO | WO 2004074984 A2 * | 9/2004 |
| WO | WO 2005086972 A2 * | 9/2005 |

OTHER PUBLICATIONS

"Wireless Village", downloaded on Nov. 15, 2006, from http://en.wikipedia.org/wiki/Wireless_Village, 1 page.

(Continued)

*Primary Examiner* — Kostas Katsikis
(74) *Attorney, Agent, or Firm* — Guntin & Gust, PLC; Andrew Gust

(57) ABSTRACT

Methods and apparatus to present presence information are disclosed. An example method includes receiving a request from a first user for presence information associated with a second user, analyzing information from a monitoring sensor associated with the second user to determine that the second user is available for communication with the first user using a first communication method and is unavailable for communication with the first user using a second communication method, and sending a message to the first user indicating that the second user is available for communication using the first communication method and is unavailable for communication using the second communication method.

24 Claims, 8 Drawing Sheets

(51) Int. Cl.
*H04L 12/58* (2006.01)
*H04L 29/08* (2006.01)

(56) References Cited

U.S. PATENT DOCUMENTS

| | | | | |
|---|---|---|---|---|
| 8,069,166 | B2* | 11/2011 | Alvarado et al. | 707/722 |
| 2002/0091798 | A1* | 7/2002 | Joshi et al. | 709/219 |
| 2003/0210770 | A1 | 11/2003 | Krejcarek | |
| 2004/0003042 | A1 | 1/2004 | Horvitz et al. | |
| 2004/0205175 | A1 | 10/2004 | Kammerer | |
| 2006/0067285 | A1 | 3/2006 | Caspi et al. | |
| 2006/0067299 | A1 | 3/2006 | Caspi et al. | |
| 2006/0068794 | A1 | 3/2006 | Caspi et al. | |
| 2006/0068795 | A1 | 3/2006 | Caspi et al. | |
| 2006/0068815 | A1 | 3/2006 | Caspi et al. | |
| 2006/0242239 | A1* | 10/2006 | Morishima et al. | 709/204 |
| 2007/0010275 | A1 | 1/2007 | Kiss | |
| 2008/0086533 | A1 | 4/2008 | Neuhauser et al. | |
| 2008/0120264 | A1* | 5/2008 | Lee | H04L 41/0893 706/47 |
| 2009/0086971 | A1* | 4/2009 | Grayson | H04L 63/0485 380/247 |
| 2012/0115514 | A1* | 5/2012 | Park | H04W 4/04 455/456.3 |
| 2013/0066731 | A1* | 3/2013 | Finnegan et al. | 705/15 |
| 2013/0157663 | A1* | 6/2013 | Brownworth | H04W 36/0083 455/436 |

OTHER PUBLICATIONS

Simone Leggio, "SIP for Instant Messaging and Presence Leveraging Extensions", Research Seminar on Hot Topics in Internet Protocols Helsinki, Finland May 11, 2004, 7 pages.

"Microsoft Office Communicator Mobile Getting Started Guide, Viewing and Changing Presence Information", downloaded on Nov. 15, 2006, from http://www.microsoft.com/technet/prodtechnol/office/livecomm/librar . . . , Published Apr. 1, 2006, Updated, May 1, 2006, 8 pages.

J. Rosenberg, "Extensible Markup Language (XML) Configuration Access Protocol (XCAP) Usages for Setting Presence Authorization", downloaded on Nov. 15, 2006, from http://www3.ietf.org/proceedings/04mar/I-D/draft-ietf-simple-xcap-a . . . , Oct. 27, 2003, 21 pages.

H. Schulzrinne, V. Gurbani, P. Kyzsivat, J. Rosenberg, "RPID: Rich Presence Extensions to the Presence Information Data Format (PIDF)", Jul. 2006, downloaded on Nov. 15, 2006, from http://www.ietf.org/rfc/rfc4480.txt, 31 pages.

"Open Mobile Alliance OMA-UAPorf-v2_0-200305520-C, User Agent Profile" Version May 20, 2003, 2003, 47 pages.

United States Patent and Trademark Office, "Non-Final Office Action," issued in connection with U.S. Appl. No. 11/693,537, on Jul. 23, 2009 (16 pages).

United States Patent and Trademark Office, "Final Office Action," issued in connection with U.S. Appl. No. 11/693,537, on Mar. 31, 2010 (19 pages).

United States Patent and Trademark Office, "Non-Final Office Action," issued in connection with U.S. Appl. No. 11/693,537, on Oct. 15, 2010 (16 pages).

United States Patent and Trademark Office, "Final Office Action," issued in connection with U.S. Appl. No. 11/693,537, on Mar. 29, 2011 (20 pages).

United States Patent and Trademark Office, "Notice of Allowance," issued in connection with U.S. Appl. No. 11/693,537, on Mar. 29, 2012 (9 pages).

* cited by examiner

METHODS AND APPARATUS TO PROVIDE PRESENCE INFORMATION

RELATED APPLICATIONS

This patent arises from a continuation of U.S. patent application Ser. No. 11/693,537, entitled Methods and Apparatus to Provide Presence Information, which was filed on Mar. 29, 2007, and is hereby incorporated herein by reference in its entirety.

FIELD OF THE DISCLOSURE

This disclosure relates generally to communication systems and, more particularly, to methods and apparatus to provide presence information.

BACKGROUND

Recently, communication systems have included the ability to send and receive information about the availability (e.g., presence) of users of the communication systems. The availability information indicates if a user has indicated that they are available for contact. For example, when a user first logs in to a communication system, they may be listed as available. Later, the user may select an option to indicate that they are busy and are not available for communication.

Communication systems provide the ability to establish whitelists and blacklists regarding which other users are authorized to receive information about the user's presence. Blacklists indicate which users are to be blocked from receiving presence information. Whitelists indicate which users are allowed to receive presence information (e.g., when the user blocks all users from receiving presence information by default and then identifies certain areas to receive the pressure information).

DETAILED DESCRIPTION

Figure 1:
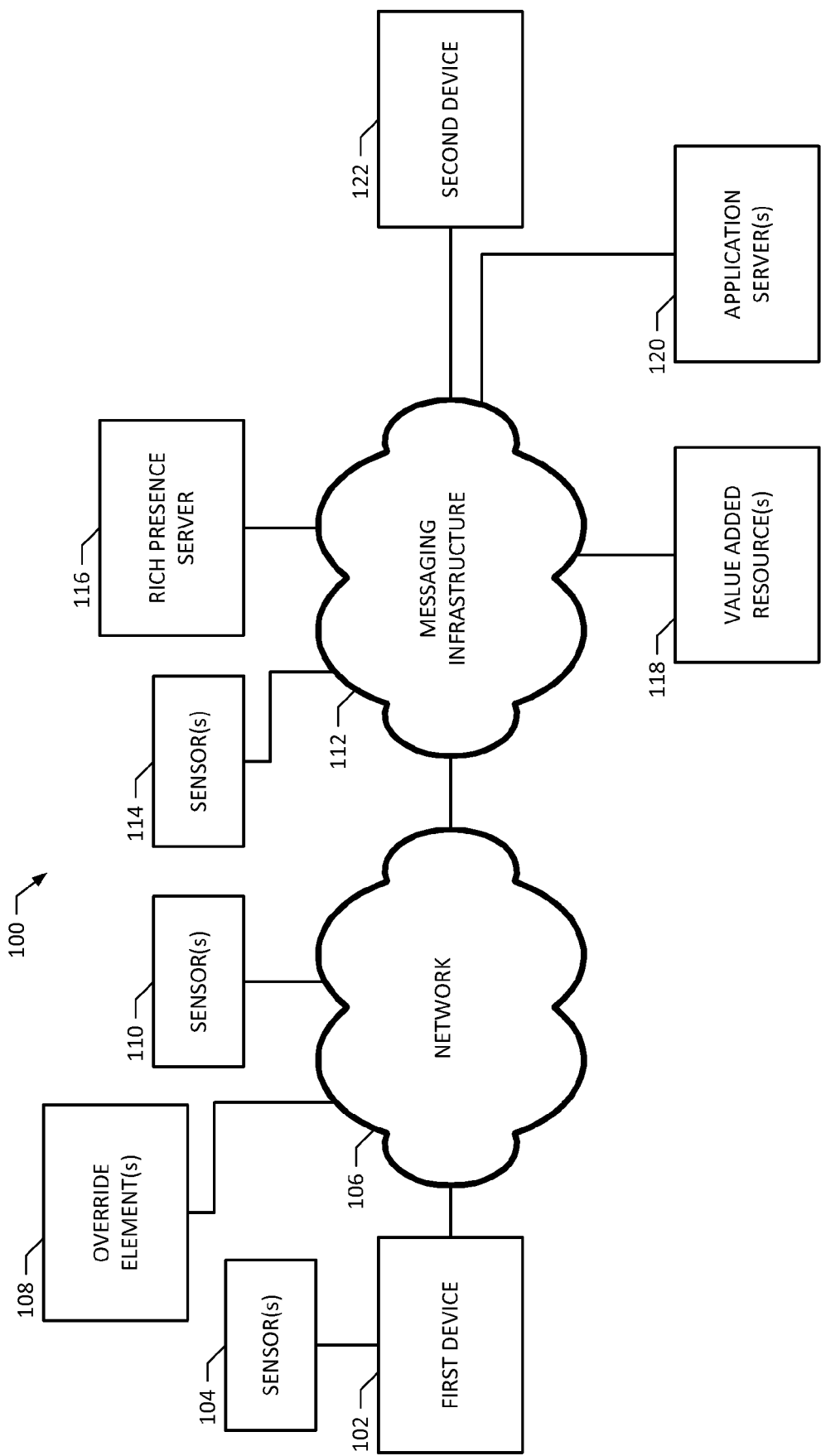
FIG. 1 is a block diagram of an example system for providing presence information.

FIG. 1 is a block diagram of an example system 100 for providing presence information. For example, the example system 100 provides quality of presence information about a first device 102 to a second device 122. In general, the quality of presence information indicates whether the first user (e.g., the presentity for which the presence is to be monitored) is available to be contacted for a messaging exchange with the second user (e.g., a watcher that is to monitor the presence of the presentity). For example, a messaging exchange may occur between the first device 102 and the second device 122 and/or a messaging exchange may occur between any two or more other devices associated with the first user and the second user. The example system 100 utilizes availability rules provided by users of the first device 102, the second device 122, one or more supervisors, one or more messaging providers, and/or any other authority to determine if the second device 102 is authorized to received presence information about the first device 102 and if the first device is available for contact by the second device 122. In addition, the example system 100 utilizes the availability rules to determine which communication methods that second device 122 may use to contact the first device 102. For example, the system 100 may determine that a first communication method is not available while a second communication method is available.

The example system 100 of FIG. 1 includes the first device 102; one or more sensors 104, 110, and 114; a network 106; a messaging infrastructure 112, a rich presence server 116, one or more value added resources 118, one or more application servers 120, and a second device 122.

The first device 102 and the second device 122 of the illustrated example are computing devices that allow users to participate in messaging (e.g., text, audio, and/or video) communication sessions. The first device 102 and the second device 122 may each be a desktop computer, a laptop computer, a mobile phone, a personal digital assistant (PDA), a smart phone, a television transceiver (e.g., an internet protocol television (IPTV) transceiver), gaming device, a voice over internet protocol (VoIP) telephone, etc. The first device 102 and the second device 122 of the illustrated example support one or more messaging communication methods. For example, if the first device 102 is a mobile phone, the first device 102 may support voice communication over a mobile phone network, text messaging over the mobile phone network, instant messaging via an internet communication channel of the mobile phone network, video conferencing via the mobile phone network, push-to-talk/walkie-talkie communication via the mobile phone network, etc.

The first device 102 and the second device 122 of the illustrated example are capable of communicating with each other regardless of whether or not they are the same type of device. To enable such communication, the first device 102 and the second device 122 of the illustrated example implement a messaging communication protocol. For example, the first device 102 and the second device 122 may each implement the AOL® open system for communication in real time (OSCAR) protocol. Persons of ordinary skill in the art will recognize that any other past, present and/or future messaging protocol may be used such as, for example, session initiation protocol (SIP), mobile status notification protocol (MSNP), extensible messaging and presence protocol (XMPP), the Yahoo!® messenger instant messaging protocol (YMSG), etc.

The first device 102 of the illustrated example is capable of reporting information about the presence of a first user of the first device 102 to the rich presence server 116 via the network 106 and the messaging infrastructure 112. For example, the first device 102 may allow the first user to specify that the first user is available for contact, is unavailable for contact, is available for contact by one or more entities specified on a list of contacts, is available for contact for certain topics, etc. In addition to sending presence information actively provided by the first user to the rich presence server 116, the first device 102 also sends information (i.e., passively obtained presence information) retrieved from the one or more sensors 104 to the rich presence server 116. The sensors 104 provide the passively obtained presence information to facilitate determining if the first user of the first device 102 is available for communication and are described in further detail below.

The second device 122 of the illustrated example is associated with a second user and is capable of requesting and/or presenting presence information (which may be passively collected by the sensor 104 or actively provided by a user) associated with the first device 102. The example second device 122 of the illustrated example sends a request for presence information to the rich presence server 116 via the messaging infrastructure 112. In alternate examples, the second device 122 may be connected to a second network (similar to the network 106) and/or may be connected to network 106. The second device 122 of the illustrated example receives presence information from the rich presence server 116 that indicates whether the first user at the first device 102 is available for communication with the second device 122. If the rich presence server 116 indicates that the user at the first device 102 is available for communication, the second device 122 may initiate a communication session with the first device 102 via the messaging infrastructure 112 and the network 106. Additionally or alternatively, the second device 122 may receive quality of presence information that is associated with the first user at the first device 102, which the second device 122 may use to determine the availability of the first user and/or the first device 102.

Persons of ordinary skill in the art will recognize that, while FIG. 1 illustrates system 100 as including two devices, any number of connected devices may be used. For example, the first user may be associated with a first plurality of communication devices (e.g., a mobile telephone, an instant messaging account for an instant messaging service, etc.) and the second user may be associated with a second plurality of communication devices (e.g., at least one device in common with the first plurality of communication devices). In addition, devices may be connected to the network 106, the messaging infrastructure 112, and/or any other network or networks that may be available.

The one or more sensors 104 of the illustrated example provide information that is used by the rich presence server 116 to determine if a user of the first device 102 is available for communication. The sensors may be may be hardware sensors or may be any type of secondary information about the environment or characteristics of a user of the first device 102. For example, any type of sensor or monitor may be used such as, for example, a monitor of a user's web browsing activity, a background noise sensor, a temperature sensor, a monitor of computer files being presented by the first device 102, a monitor of the capabilities of the first device 102 (e.g., the capability to provide video chat), a monitor of the number of persons in close proximity to the first device 102, a monitor of the screen contrast of the first device 102, an indication of a wireless signal strength, an indication of the in which a user is partaking (e.g., driving an automobile), a global position system (GPS) device, etc. The sensors 102 may be integrated in the first device 102 (e.g., software running on the first device 102, hardware integrated in the first device 102, etc.) or may be separate from the first device 102. For example, a sensor or monitor that is separate from the first device 102 may be communicatively coupled to the first device 102 via a wired or wireless connection.

The network 106 of the illustrated example is an internet protocol (IP) communication network. The example network 106 provides communication between the first device 102 and the messaging infrastructure 112. The network 106 may be implemented by any type(s) of network(s) and/or may be comprised of multiple coupled networks. The example network 106 of FIG. 1 includes one or more sensors 110, which are described below.

The one or more override elements 108 of the illustrated example are network elements such as edge gateways/proxies, filters, and/or firewalls that may include presence access authorization information. For example, an override element 108 may be implemented by a residential gateway or a network proxy where a parent has programmed white lists or blacklists based on specific parameters such as time of day, screen names, application that is currently being accessed, etc. In another example, the one or more override elements 108 may be an enterprise firewall that may block or have override control over the nature and quality of the presence information regarding the user based on, for example, who it is being shared with and/or when and/or how the information is being shared. The one or more override elements 108 may enforce access restrictions on presence information and/or may transmit the access restriction information to the rich presence server 116.

The one or more sensors 110 of the illustrated example monitor communication on the network 106 and provide the results of the monitoring to the rich presence server 116. For example, the sensors 110 may monitor the speed of communications on the network, the relative load of the network 106, and/or any other type of information that may relate to the quality of communication sessions that are connected via the network 106.

The messaging infrastructure 112 of the illustrated example comprises one or more servers and/or networks that enable communication between multiple devices connected to the messaging infrastructure 112 (e.g., the first device 102 and the second device 122). The architecture of the messaging infrastructure 112 is dependent on the type(s) of communication protocol(s) supported by the messaging infrastructure.

The one or more sensors 114 of the illustrated example monitor the messaging infrastructure 112 and/or the communication sessions that are handled by the messaging infrastructure 112. The sensors 114 send the results of the monitoring to the rich presence server 116 for use in determining the presence level of a device (e.g., the first device 102). For example, the sensors 114 may monitor the relative load of one or more messaging server(s), the relative load of one or more authentication server(s), the operational state of one or more messaging server(s), the operational state of one or more authentication server(s), etc. In an alternate example, the sensors 114 and the sensors 110 may be of the same type and/or may be the same device.

The rich presence server 116 of the illustrated example receives presence information from the first device 102 and/or monitoring results from the one or more sensors 104, 110, and 114. Based on the received information the rich presence server 116 determines the availability of a user at the first device 102. The example rich presence server 116 also receives requests from the second device 122 for presentation of the presence information. The example rich presence server 116 of FIG. 1 evaluates rules stored at the rich presence server 116 to determine if the second device 122 is authorized to be informed of the presence status of the user of the first device and, if so, sends the presence information to the second device 122. An example implementation of the rich presence server 116 is described in further detail in conjunction with FIG. 2.

The rich presence server 116 of the illustrated example is capable of storing one or more authorization rules defining users who are permitted to view a given messaging user's presence information. For example, the rich presence server 116 may store a set of rules set by the user, by a supervisor or proxy (e.g., parent, guardian, employer, etc.), by the messaging provider, set by a network provider, and/or by any other entity. The rich presence server 116 is capable of integrating two or more sets of rules and/or employing the integrated set of rules to determine if a particular device requesting presence information is authorized to receive the presence information. In the case of a rule conflict, the server 116 of the illustrated example may default to disallow communication of the presence information. In addition, the rich presence server 116 of the illustrated example is capable of determining how much presence information the requesting device is authorized to receive. For example, the rules may indicate that the rich presence server 116 should send a message to a device requesting presence information for a user indicating that presence information cannot be provided (e.g., the device is not authorized to receive presence information), to send a message to another device indicating that the user is not available for communication, and/or to send a message to yet another device indicating that the user is available for communication. In a further example, the rich presence server 116 may evaluate the rules to determine that a first user is authorized to receive qualitative information indicating that a user is not available for communication because the user is working on schoolwork for a particular class, a second user is authorized to receive information indicating only that the user is working on schoolwork, and a third user is authorized to receive information indicating only that the user is unavailable. In other words, the rich presence server 116 is capable of determining the level of presence information that should be provided.

The rich presence server 116 is capable of selecting between the multiple communication methods available for a user of the first device 102. For example, the rules established for the first device 102 (e.g., rules associated with a user of the first device 102) may indicate that the user is not available for communication using a first communication method (e.g., the user is not available for text messaging because the user is driving an automobile). However, the rules may indicate that the user is available for a communication using a second communication method (e.g., the user is available for communication via telephone because the user is equipped with a hands-free device that allows communication while driving). In addition, the rich presence server 116 may evaluate received rules to determine communication priority (e.g., priority among communication methods, priority among communication participants, etc.) at a particular instant in time. For example, the rich presence server 116 may determine that a first communication session with a first communication method should be disconnected when a second, preferred, communication method becomes available. Similarly, the rich presence server 116 may determine that a communication between the first device 102 and the second device 122 should be disconnected and a communication session between the first device 102 and a third device be connected when the third device is a preferred device.

While the rich presence server 116 in some example implementations may evaluate received quality of presence information (e.g., information received from the first device 102, the sensors 104, the override elements 108, etc.), the rich presence server 116 may alternatively evaluate rules to determine what presence information should be sent to a requesting device (e.g., the second device 122). For example, the rich presence server 116 may evaluate the received and/or stored rules to determine that a first requesting device is authorized to receive all available quality of presence information and that a second requesting device is authorized only to receive vague information. When the rich presence server 116 does not evaluate the received quality of presence information to determine availability, the devices (e.g., the second device 122) that receive the quality of presence information will evaluate the quality of presence information to determine available communication methods.

While the example rich presence server 116 is illustrated as a single device, in alternate examples the rich presence server 116 may be implemented as several devices connected to the network 106 and/or the messaging infrastructure 112. For example, the rich presence server 116 may be implemented as a supplement server to a presence server that is not capable of monitoring sensors and multiple presence authorization lists.

The one or more value added resources 118 of the illustrated example are resources in the messaging infrastructure 112 the provide capabilities such as transcoding (of multimedia), compression capabilities (for video or voice), Quality of service monitoring (QoS), caching and storage, providing subscription information relating to roaming and charging, language translation, etc. A user may wish to incorporate the status or availability of these resources in order to make a qualitative determination about the presence information. Accordingly, the content of these resources may be transmitted to and/or may be accessible by the rich presence server 116.

The one or more application servers 120 of the illustrated example are one or more servers that provide one or more applications to one or more end users (e.g., a user at the first device 102). For example, the one or more application servers may render content, enable voice or video telephony, and/or provide instant messaging. The one or more application servers 120 of the illustrated example incorporate the presence and availability information in the context of the application. For example, the one or more application servers 120 may include an instant messaging server that provides a contact list that includes information about whether the contacts identified in the contact list are available.

Figure 2:
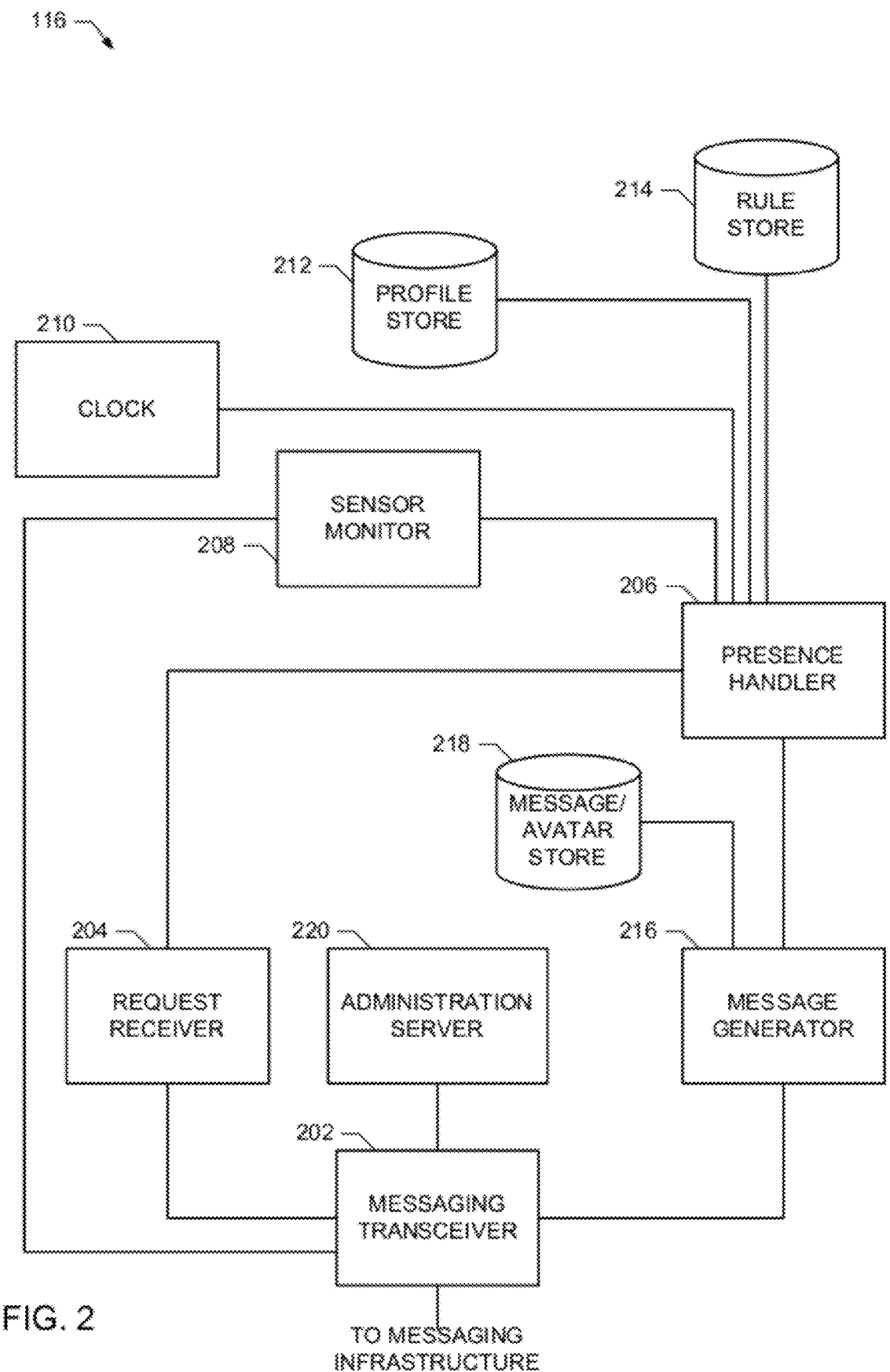
FIG. 2 is a block diagram of an example implementation of the rich presence server 116 of FIG. 1.

FIG. 2 is a block diagram of an example implementation of the rich presence server 116 of FIG. 1. The example rich presence server 116 includes a messaging transceiver 202, a request receiver 204, a presence handler 206, a sensor monitor 208, a clock 210, a profile store 212, a rule store 214, a message generator 216, a message/avatar store 218, and an administration server 220.

The messaging transceiver 202 of the illustrated example communicatively couples the rich presence server 116 with the messaging infrastructure 112 of FIG. 1. The example messaging transceiver 202 receives monitoring information from the one or more sensors 104, 110, and/or 114, and/or receives requests (e.g., requests for presence information, requests to change presence status, etc.). The example messaging transceiver 202 transmits sensor monitoring information to the sensor monitor 208. The example messaging transceiver 202 also transmits presence information (e.g., messages indicating the presence status of a device) via the messaging infrastructure 112.

The request receiver 204 of the illustrated example receives requests from devices (e.g., requests for presence information, requests to change presence status, etc.) and determines the identity of the source of the request. For example, a request may include a username associated with the source of the request. In another example, the request receiver 204 may determine a network address where the request originated. If the request is a request for presence information of a user other than the user at the originating point of the request, the request receiver determines the identity of the requested user. The request receiver 204 sends the request and the identity information to the presence handler 206.

When the presence handler 206 of the illustrated example receives a request and identity information and processes the received data to satisfy the request. For example, if the request is to update the presence of a user, the presence handler edits the presence information stored in the profile store 212 associated with the source of the request. In another example, if the request is a request for presence information associated with a requested user, the presence handler retrieves information from one or more of the sensor monitor 208, the clock 210, the profile store 212, and the rule store 214 and processes the information to determine if the requesting user is authorized to receive the requested information and, if so, what presence information should be sent to the requesting user.

The sensor monitor 208 of the illustrated example receives and stores information received from the one or more sensors 104, 110, and/or 114 of FIG. 1. When requested, the sensor monitor 208 sends sensor information to the presence handler 206. For example, the sensor monitor 208 also may include a database that stores sensor information associated with a particular user, a particular network, and/or a particular messaging infrastructure. In addition, the sensor monitor 208 may be capable of determining which sensor information is associated with a particular user (e.g., which network sensors are associated with a network to which the user's device is connected, etc.). Alternatively, the presence handler 206 may be capable of requesting information from specific sensors that the presence handler 206 has determined are relevant to a particular request.

The clock 210 of the illustrated example provides the current time and date, which may be used for evaluating rules at the presence handler 206. For example, a rule stored in the rule store 214 may indicate that a user (e.g., a child) is available for general communication between 3 PM and 5 PM on weekdays, is available for communication regarding home between 5 PM and 8 PM, but is unavailable for general communication between 5 PM and 8 PM.

The profile store 212 of the illustrated example stores profile information associated with one or more users of the messaging infrastructure 112 for which presence information is monitored. In addition, the example profile store 212 stores the current presence status (e.g., quality of presence information associated with one or more communication methods) reported and monitored by devices (e.g., the first device 102 of FIG. 1). The profile information may include age information for a user, information about supervisors of a user, information about sensors that are associated with the user, information about which devices have subscribed to monitor the presence status of the user, etc. The information stored in the example profile store 212 may be modified by requests from the first device 102 (e.g., a change in presence status), via the administration server 220, by a messaging provider, etc.

The rule store 214 of the illustrated example stores rules associated with the handling of presence information. The example rule store 214 is a database that associates one or more static and/or dynamic rules with users. The rules stored in the rule store 214 may include one or more blacklists (e.g., a list that indicates which users/devices are not allowed to receive presence information for one or more other specified users), one or more whitelists (e.g., a list that indicates which users/devices are allowed to receive presence information for one or more other specified users, one or more greylists (e.g., a list that indicates that users are allowed to receive some, but not all presence information for one or more other specified users), etc. In addition to lists, the example rules store 214 may include one or more rules to qualitatively determine the presence status of a user. For example, a rule may indicate that when available sensors indicate that the background noise associated with a given device is above a certain level, the corresponding user should be reported as unavailable for audio communication (though the user may be reported as available for other types of communication). In another example, a rule may indicate that if a corresponding user is viewing one or more webpages related to schoolwork, the user is available for contact regarding schoolwork, but is unavailable for contact regarding other topics.

The rule store 214 of the illustrated example is capable of storing conflicting rules for a user that are associated with different rule sources. For example, the rule store 214 may store a first rule indicating that a user is available for contact between 8 AM and 8 PM (e.g., a rule set by a user) and a second rule indicating that a user is not available for contact between 5 PM and 8 PM (e.g., a rule set by a parent of the user). The presence handler 206 will use information about the source of the rules to determine how to resolve the rules conflict. For example, the presence handler 206 may determine that rules set by a parent should always override rules set by the user. For conflicting rules set by authorities of the same level, the presence handler 206 may default to disallowing the information (i.e., performing an AND operation on the rules).

The rule store 214 of the illustrated example is capable of storing rules establishing priorities for communication at any given instant in time. The rules may establish a priority of communication methods. For example, communication via a telephone may be preferred to communication via text messaging. The rules may establish communication method priorities for each possible communication partner. The rules may be dependent upon a number of external or intrinsic factors such as, for example, the location of the user, other tasks the user is performing, ambience, etc. For example, communication via telephone may be preferred with a first communication partner and communication via text messaging may be preferred with a second communication partner. Additionally or alternatively, the rules may establish a priority for communication partners. For example, communication with a first communication partner may be preferred to communication with a second communication partner. Therefore, if communication is occurring with the second communication partner at a time when the first communication partner requests a communication session, the communication session with the second communication partner may be terminated and a communication session with the first communication partner may be initiated. Priorities may be communicated to users requesting presence information or, alternatively, non-preferred communication methods may be reported as unavailable.

The message generator 216 of the illustrated example receives presence information from the presence handler 206 and generates a message indicating the presence status (e.g., available, unavailable, blocked, etc.) for transmission to the user requesting the presence information. The example message generator 216 formats the message as an extensible markup language (XML) message. The XML message format allows the message generator 216 to generate messages that can be read by multiple number and/or types of communication clients. Alternatively, the message generator 216 may generate messages in one or more other, possibly proprietary, past, present and/or future message formats.

The example message generator 216 of FIG. 2 retrieves message and avatar information from the message/avatar store 218. Messages and/or avatars retrieved from the message/avatar store 218 may be incorporated in the generated presence message. For example, the message/avatar store 218 may store a particular message that should be sent when a particular user is not available for communication. Additionally or alternatively, the message/avatar store 218 may store a particular avatar that should be sent when the particular user is available for a particular type of communication.

After generating the one or more messages, the message generator 216 sends the generated messages to the messaging transceiver 202 for transmission to the requesting user/device.

The message/avatar store 218 of the illustrated example stores messages and/or avatars that may be used in presenting presence information. For example, the message/avatar store 218 may store a set of messages that may be used to present presence information for a particular type of circumstance (e.g., a blocked avatar). Additionally and alternatively, the message/avatar store 218 may store a set of avatars that may be used to present presence and availability information for a particular user. The message/avatar information may be administered via the administration server, may be received from the messaging device (e.g., the first device 102), and/or may be downloaded or modified in any other way.

The administration server 220 of the illustrated example enables administration of the information stored in the rich presence server 116. The example administration server 220 of FIG. 2 provides a web server for serving one or more web pages that enable modification of the stored information. For example, the administration server 220 may require a user or a proxy/supervisor to login with an assigned username, password, and/or other authentication mechanism. Upon successfully logging in, the user may be presented with a list of options regarding which information is to be modified. For example, the user may select to modify the rules information. The user is then presented with the current set of rules and provided the option to modify the rules. The example administration server 220 restricts users from changing rules that were not created by that user and/or that were created by a user with a higher level of authorization. For example, if a child logs in to the administration server 220 they will not be allowed to modify rules established by their parent. While the administration server 220 is described as a web server, any other type of implementation allowing a user to modify information stored in the rich presence server 116 may alternatively be used.

FIGS. 3-6 are flowcharts representative of example machine readable instructions that may be executed to implement the example first device 102, the example one or more sensors 104, 110, and 114, the example messaging infrastructure 112, the example rich presence server 116, the example value added resources 118, the example application servers 120, and/or the example second device 122 of FIG. 1, and/or to implement the example request receiver 204, the example presence handler 206, the example sensor monitor 208, the example message generator 216, and/or the example administration server 220 of FIG. 2. The example machine readable instructions of FIGS. 3-6 may be executed by a processor, a controller, and/or any other suitable processing device. For example, the example machine readable instructions of FIGS. 3-6 may be embodied in coded instructions stored on a tangible medium such as a flash memory, or random access memory (RAM) associated with a processor (e.g., the processor 1012 shown in the example processor platform 1000 and discussed below in conjunction with FIG. 8). Alternatively, some or all of the example flowcharts of FIGS. 3-6 may be implemented using an application specific integrated circuit (ASIC), a programmable logic device (PLD), a field programmable logic device (FPLD), discrete logic, hardware, firmware, etc. In addition, some or all of the example flowcharts of FIGS. 3-6 may be implemented manually or as combinations of any of the foregoing techniques, for example, a combination of firmware, software, and/or hardware. Further, although the example machine readable instructions of FIGS. 3-6 are described with reference to the flowcharts of FIGS. 3-6, persons of ordinary skill in the art will readily appreciate that many other methods of implementing the example first device 102, the example one or more sensors 104, 110, and 114, the example messaging infrastructure 112, the example rich presence server 116, the example value added resources 118, the example application servers 120, the example second device 122, the example request receiver 204, the example presence handler 206, the example sensor monitor 208, the example message generator 216, and/or the example administration server 220 may be employed. For example, the order of execution of the blocks may be changed, and/or some of the blocks described may be changed, eliminated, sub-divided, and/or combined. Additionally, persons of ordinary skill in the art will appreciate that the example machine readable instructions of FIGS. 3-6 be carried out sequentially and/or carried out in parallel by, for example, separate processing threads, processors, devices, circuits, etc.

Figure 3:
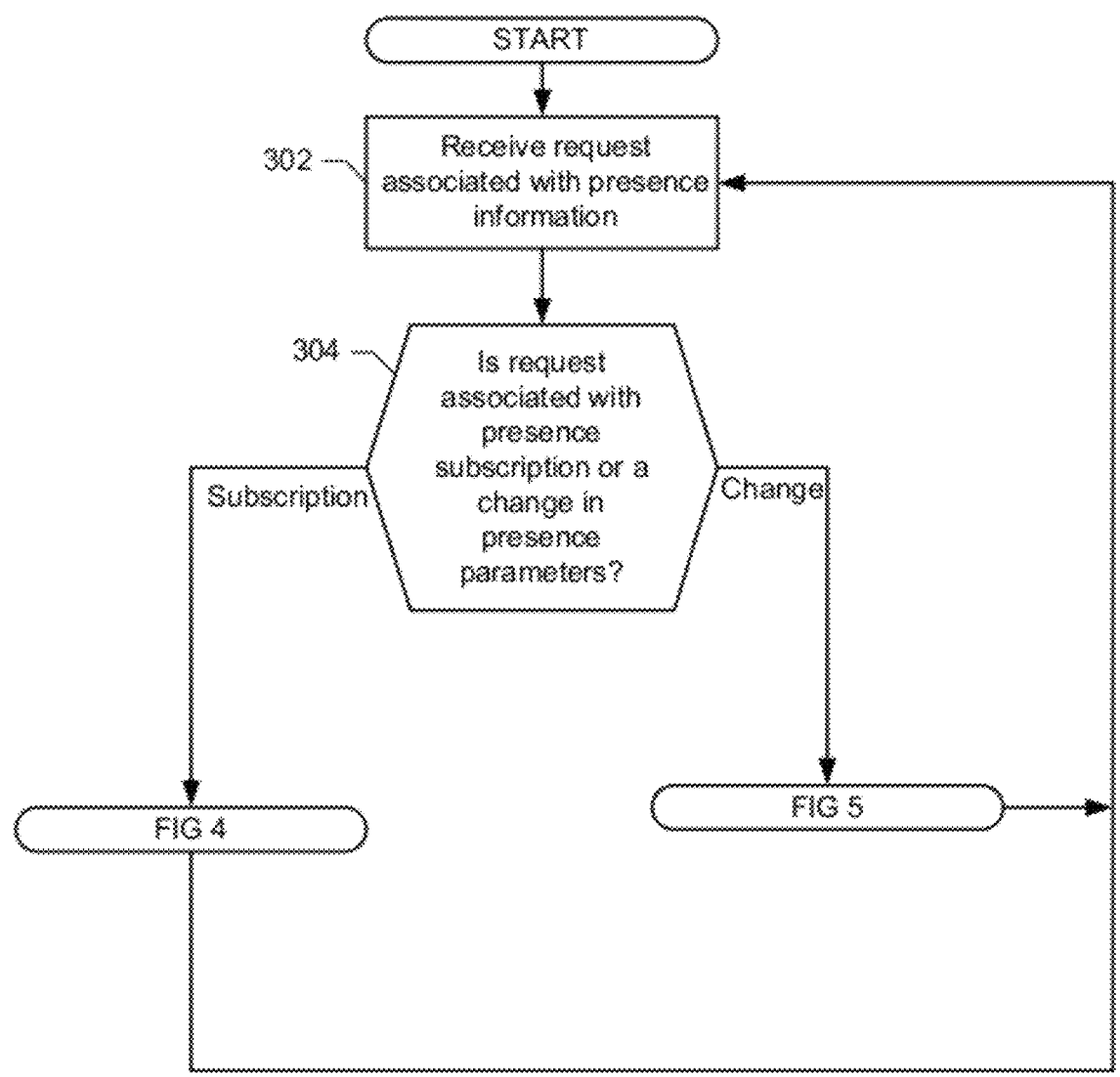
FIG. 3 is a flowchart representative of example machine readable instructions that may be executed to implement the example rich presence server of FIGS. 1 and 2.

FIG. 3 is a flowchart representative of example machine readable instructions that may be executed to implement the example rich presence server 116 of FIGS. 1 and 2. The example machine readable instructions of FIG. 3 begin when the example request receiver 204 of FIG. 2 receives a request associated with presence information (block 302). The request receiver 204 or the presence handler 206 determines if the request is associated with a presence subscription (e.g., a request from the second device 122 of FIG. 1 to monitor the presence status of the first device 102) or a presence status change (e.g., a message from the first device 102 indicating that the presence status of a user of the first device 102 should be changed) (block 304).

Figure 4:
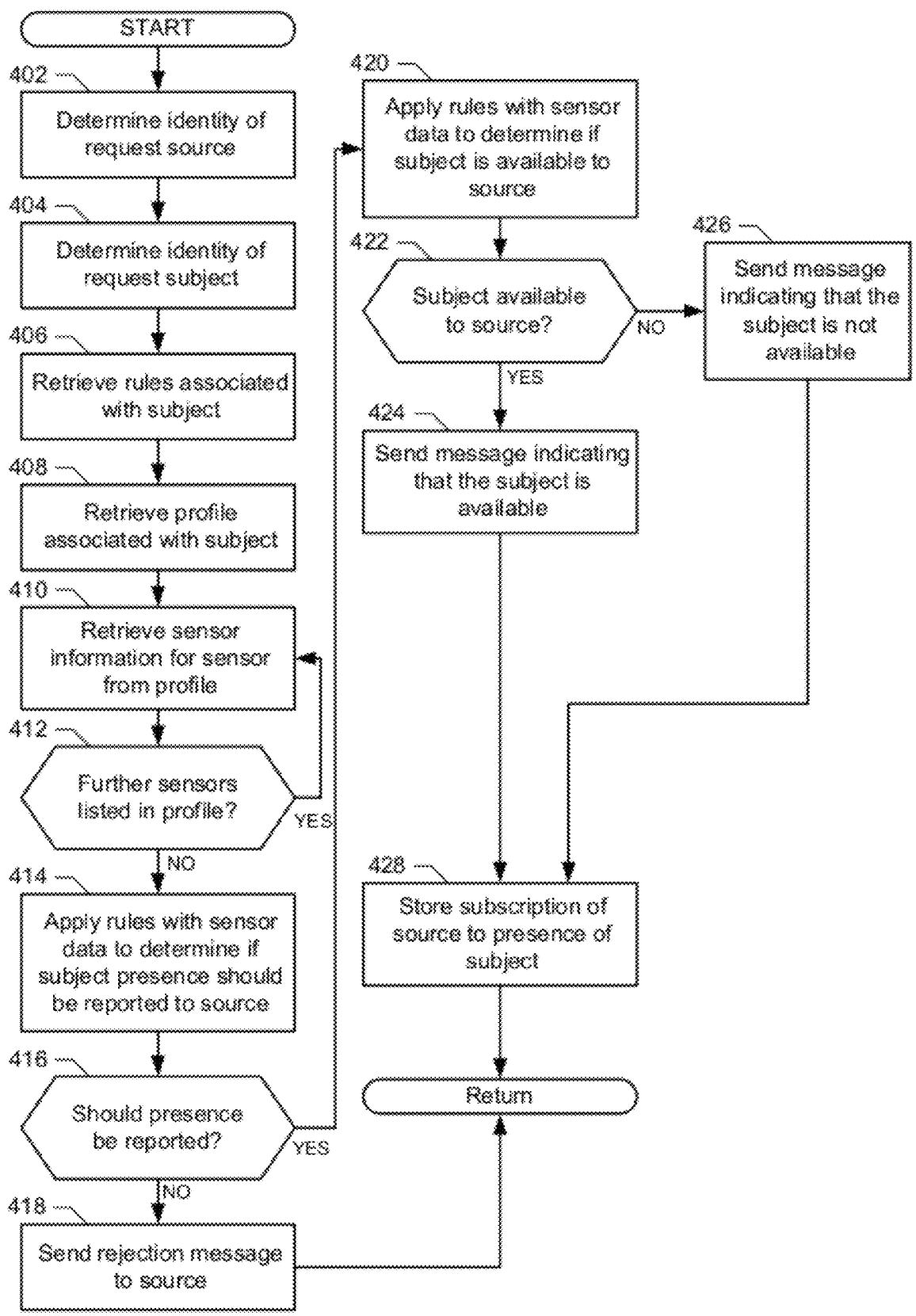
FIG. 4 is a flowchart representative of example machine readable instructions that may be executed to implement the example rich presence server of FIGS. 1 and 2.
Figure 5:
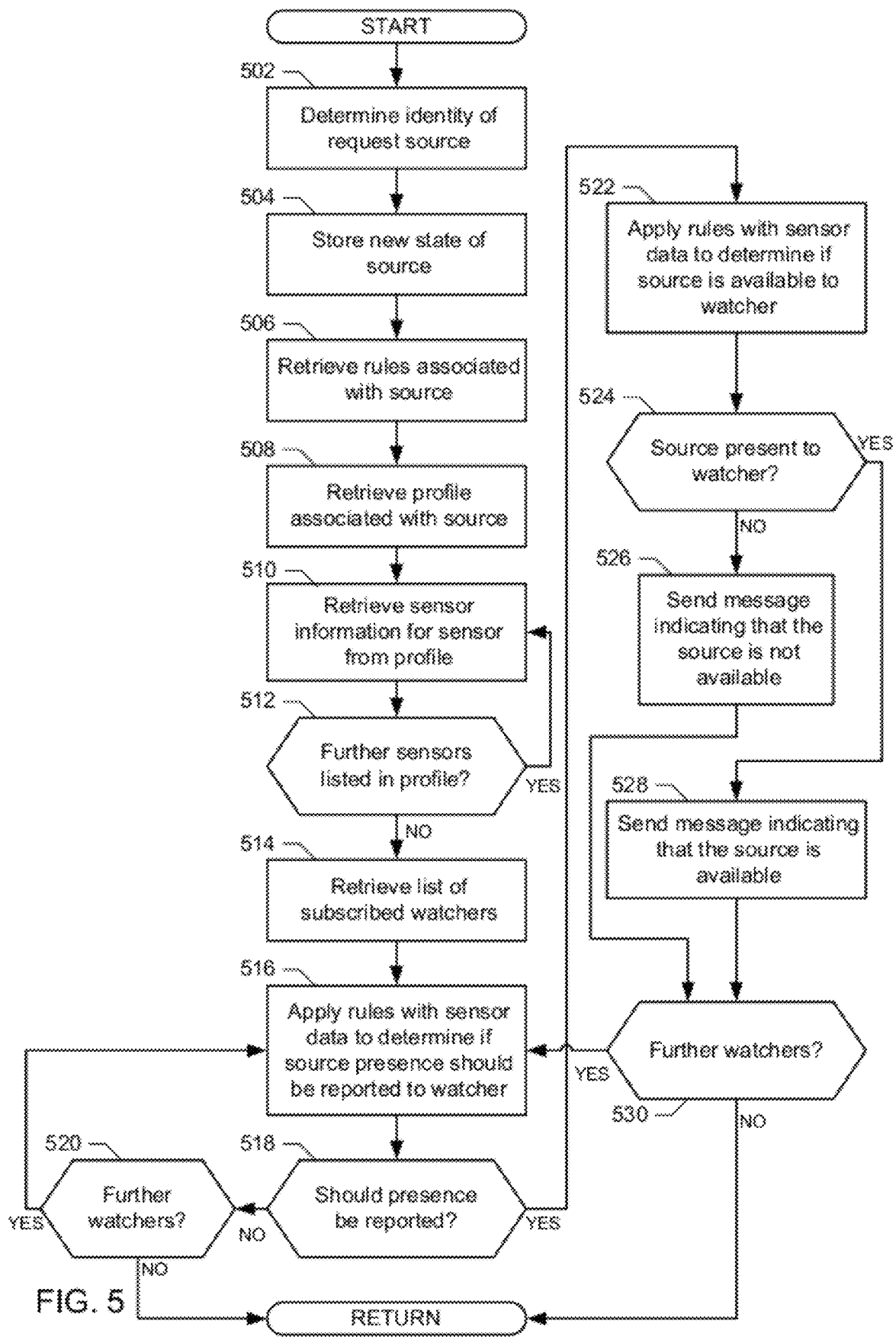
FIG. 5 is a flowchart representative of example machine readable instructions that may be executed to implement the example rich presence server of FIGS. 1 and 2.

If the request is a presence subscription request (block 304), control proceeds to the machine readable instructions illustrated in FIG. 4. If the request is a presence status change request, control proceeds to the machine readable instructions illustrated in FIG. 5. After the machine readable instructions illustrated in either FIG. 4 or FIG. 5 are completed, control returns to block 302 to await further requests. Persons of ordinary skill in the art will recognize that multiple requests may be received and queued for processing or processed simultaneously in parallel threads.

FIG. 4 is a flowchart representative of example machine readable instructions that may be executed to implement the example rich presence server 116 of FIGS. 1 and 2. As described in conjunction with FIG. 3, the machine readable instructions of FIG. 4 are executed to handle a request for a subscription to presence information. The example machine readable instructions of FIG. 4 begin when the presence handler 206 of FIG. 2 determines the identity of the source of the request (i.e., the watcher) (block 402). For example, the request may include a username (e.g., an instant messaging screen name) of the user that initiated the subscription request. The example presence handler 206 then determines the identity of the subject of the request (i.e., the user/device for which the presence is to be monitored by the source of the request) (block 404).

After determining the source and subject of the request, the presence handler 206 retrieves rules from the rule store 214 associated with the subject of the request (block 406). The presence handler 206 then retrieves profile information associated with the subject of the request from the profile store 212 (block 408). Then the presence handler 206 retrieves information from the first sensor (e.g., one of the sensors 104, 110, and/or 114) listed in the profile from the sensor monitor 208 (block 410). The presence handler 206 then determines if there are further sensors listed in the profile (block 412). If there are further sensors listed in the profile, control returns to block 410 to retrieve information from the next sensor.

If there are no further sensors listed in the profile (block 412), the presence handler 206 applies the rules with the sensor information to determine if the subject presence should be reported to the source of the request (block 414). For example, the presence handler 206 may merge two conflicting rules by overriding a lower priority rule (e.g., a rule set by an employee) with a higher priority rule (e.g., a rule set by an employer of the employee). In addition, the presence handler 206 may determine if the rules indicate that based on the sensor data, the presence should not be reported. For example, the rules may indicate that presence data should not be reported after a certain time of day, should not be reported when the subject is browsing a particular website or type of website, should not be reported when the subject is using a mobile phone, should not be reported when the subject is in a public place, etc. Based on the application, the presence handler 206 determines if the rules and/or sensor information indicate that the presence information should be reported to the source of the request (block 416). If the presence data should not be reported to the source of the request, the message generator 216 generates and sends a message indicating that presence information is not available to the source for the subject (block 418). Control then returns to block 302 of FIG. 3.

If the presence data should be reported to the source of the request (block 416), the presence handler 206 applies the rules with the sensor information to determine if the subject is available to the source of the request (block 420). For example, the subject may report that they are generally available, the sensors may indicate that the user is browsing a science related website, and the rules may indicate that the subject is only available for contact by others that are browsing similar websites. Accordingly, while the subject is generally available, if the source of the request is not browsing a similar website, the presence may be reported as not available. In another example, a subject may report that they are generally available, but a rule set by a supervisor (e.g., a parent, an employer, etc.) may indicate that the subject is not available for communication during set time interval(s). Accordingly, if the current time is within such a time interval, the subject presence will be reported as unavailable for communication. The presence handler 206 determines if the rules and the sensor information indicate that the subject is available for communication with the source of the request (block 422). If the rules and the sensor information indicate that the subject is not available for communication with the source, the message generator 216 generates and sends a message to the source of the request indicating that the subject is not available (block 426) and control proceeds to block 428. For example, the message generator 216 may query the message/avatar store 218 to determine a message or avatar associated with the subject that indicates that the subject is not available for communication (e.g., a message that reads "This user is currently unavailable for contact," an image of a slash through a red circle, etc.).

While blocks 422-426 describe a single indication of availability, it should be understood that the presence handler 206 may iterate through available communication methods to report presence and availability information for each of the communication methods. For example, the presence handler 206 may report that a first communication method is not available, but may report that a second communication method is available based on the rules.

If the rules and the sensor information indicate that the subject is available for communication with the source of the request (block 422), the message generator 216 generates and sends a message to the source of the request indicating that the subject is available for communication (block 424). The message may include specific attributes of presence and availability information that results from the application of the rules and inputs received from sensors, etc. One example attribute can be indicative of "this user is available for communication only via email at the present time" or "this user is available for 15 minutes at this phone number XXX-XXX-XXXX", etc. For example, the message generator 216 may query the message/avatar store 218 to determine a message or avatar associated with the subject that indicates that the subject is available for communication (e.g., a message that reads "This user is currently available for communication," an image of a smiley face, etc.).

After the message generator 216 sends a message indicating the presence status of the subject (e.g., block 424 or block 426), the presence handler 428 stores the subscription information for the source of the request in the profile store 212 (block 428). For example, the presence handler 428 may store the subscription information in a record associated with the subject of the request. Accordingly, when the presence status of the subject of the request changes, the presence handler 206 can send a message to the source of the request indicating that the presence status has changed. Such a status change can be triggered by a change in the information provided by one of the sensors, rules database, or other means. Control then returns to block 302 of FIG. 3.

FIG. 5 is a flowchart representative of example machine readable instructions that may be executed to implement the example rich presence server 116 of FIGS. 1 and 2. As described in conjunction with FIG. 3, the machine readable instructions of FIG. 5 are executed to handle a request for a change in presence status (i.e., a change in the state of the presence information (e.g., from available to unavailable)), which includes sending the updated status to users that are subscribed to watch the presence information. The machine readable instructions of FIG. 5 begin when the presence handler 206 of FIG. 2 determines the identity of the source of the presence status change request (block 502). If the source is authorized to make a change, the presence handler 206 then stores the updated status in the profile store 212 (block 504).

After storing the updated presence status (block 504), the presence handler 206 retrieves one or more rules associated with the source of the request from the rule store 214 (block 506). Then, the presence handler 206 retrieves the profile associated with the source of the request from the profile store 212 (block 508). The presence handler 206 then retrieves sensor information from the first sensor listed in the profile (block 510). Next, the presence handler 206 determines if there are further sensors listed in the profile (block 512). If there are further sensors listed in the profile, control returns to block 510 to retrieve information from the next sensor (block 514).

If there are no further sensors listed in the profile (block 512), the presence handler 206 retrieves a list of subscribed watchers (e.g., users/devices that have subscribed to receive presence information about the source of the request) from the profile (block 514). The presence handler 206 then applies the rules and the sensor information to determine if the update on the presence status should be reported to the first subscribed watcher (block 516). If the rules and the sensor information indicate that the presence information should not be reported to the first subscribed watcher, the presence handler 206 determines if there are further subscribed watchers listed in the profile (block 520). If there are further subscribed watchers listed in the profile that might be impacted by the change in the availability status, control returns to block 516 to process the next subscribed watcher. If there are no further subscribed watchers, control returns to block 302 of FIG. 3.

If the rules and sensor information indicate that the presence information should be reported to the first subscribed watcher (block 518), the presence handler 206 applies the rules and sensor information to determine if the source is available to the subscribed watcher (e.g., if the source is available to participate in a communication session with the subscribed watcher and/or other devices) (block 522). The presence handler 206 then determines if the applied rules and sensor information indicates that the source should be reported as available to the subscribed watcher (block 524). If the rules and the sensor information indicate that the source is not available to the subscribed watcher, the message generator 216 generates and sends a message to the subscribed watcher indicating that the source is unavailable for communication (block 526). Control then proceeds to block 530.

If the rules and the sensor information indicates that the source is available to the subscribed watcher (block 524), the message generator 216 generates and sends a message to the subscribed watcher indicating that the source is available for communication (block 528). The message will include specific attributes of presence and availability information that results from the application of the rules and inputs received from sensors, etc. Control then proceeds to block 530.

While blocks 524-528 describe a single indication of availability, it should be understood that the presence handler 206 may iterate through available communication methods to report presence and availability information for each of the communication methods. For example, the presence handler 206 may report that a first communication method is not available, but may report that a second communication method is available based on the rules.

After sending a message indicating the presence status to the subscribed watcher (block 526 or block 528), the presence handler 206 determines if there are further subscribed watchers listed in the profile associated with the source of the presence status change request (block 530). If there are further subscribed watchers, control returns to block 516 to update the subscribed watchers. Each subscribed watcher may receive different messages of the availability information. If there are no further subscribed watchers, control returns to block 302 of FIG. 3.

Figure 6:
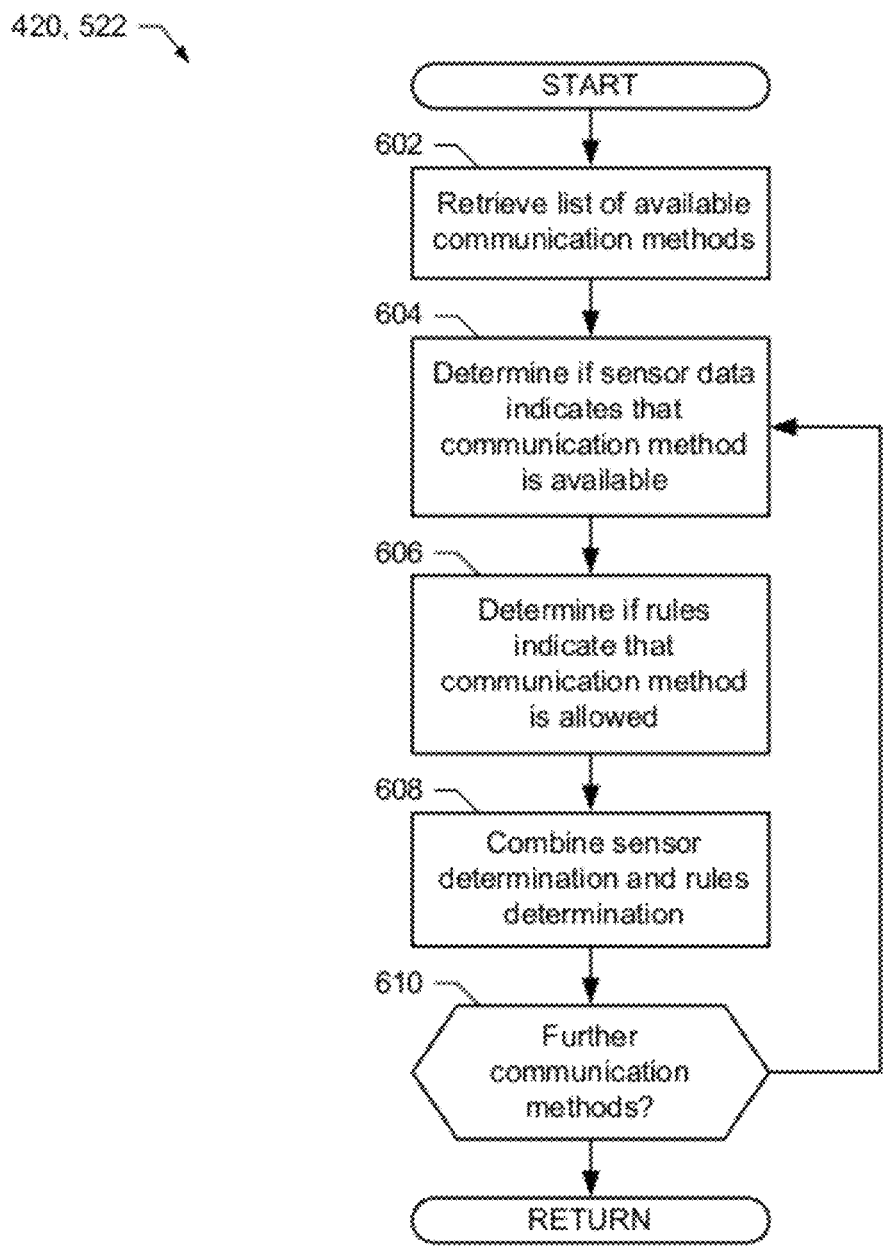
FIG. 6 is a flowchart representative of example machine readable instructions that may be executed to implement the example rich presence server of FIGS. 1 and 2.

FIG. 6 is a flowchart representative of example machine readable instructions that may be executed to implement block 420 of FIG. 4 and/or block 522 of FIG. 5. The example machine readable instructions of FIG. 6 iterate over the available communication methods to provide availability information for each communication method. The example machine readable instructions of FIG. 6 begin when the presence handler 206 retrieves a list of available communication methods from the profile store 212 (block 602). For example, the communication methods may include video conferencing, text messaging, one or more instant messaging protocols, audio communication, etc. The presence handler 206 then determines if the sensor data indicates that the user/device to be reported is available to use the communication method (block 604). For example, the sensor data may indicate that the background noise level for the user/device is too high or the room lighting is inappropriate for a videoconferencing communication session. In another example, the sensor data may indicate that the user is unavailable for text messaging because the user is available for instant messaging (e.g., is unavailable to use a pay-per-use communication method when a free service is available).

The presence handler 206 then determines if the rules indicate that the communication method is currently available (block 606). For example, the rules may indicate that the user/device is unavailable for text messaging between certain times but is available for instant messaging during that time. The presence handler 206 then combines the sensor determination and the rules determination (block 608). For example, the presence handler 206 may determine that the user/device is unavailable for a particular communication method if either the rules or the sensor data indicates that the user/device is unavailable. Alternatively, the presence handler 206 may determine that a user/device is available if the rules indicate that the user/device is available even though some sensor information indicates that the communication method may not be desirable.

The presence handler 206 then determines if there are further communication methods to be evaluated (block 610). If there are further communication methods available, control returns to block 604. If there are no further communication methods available, control returns to block 422 and/or block 524 with the list of communication methods and their associated presence status.

Figure 7:
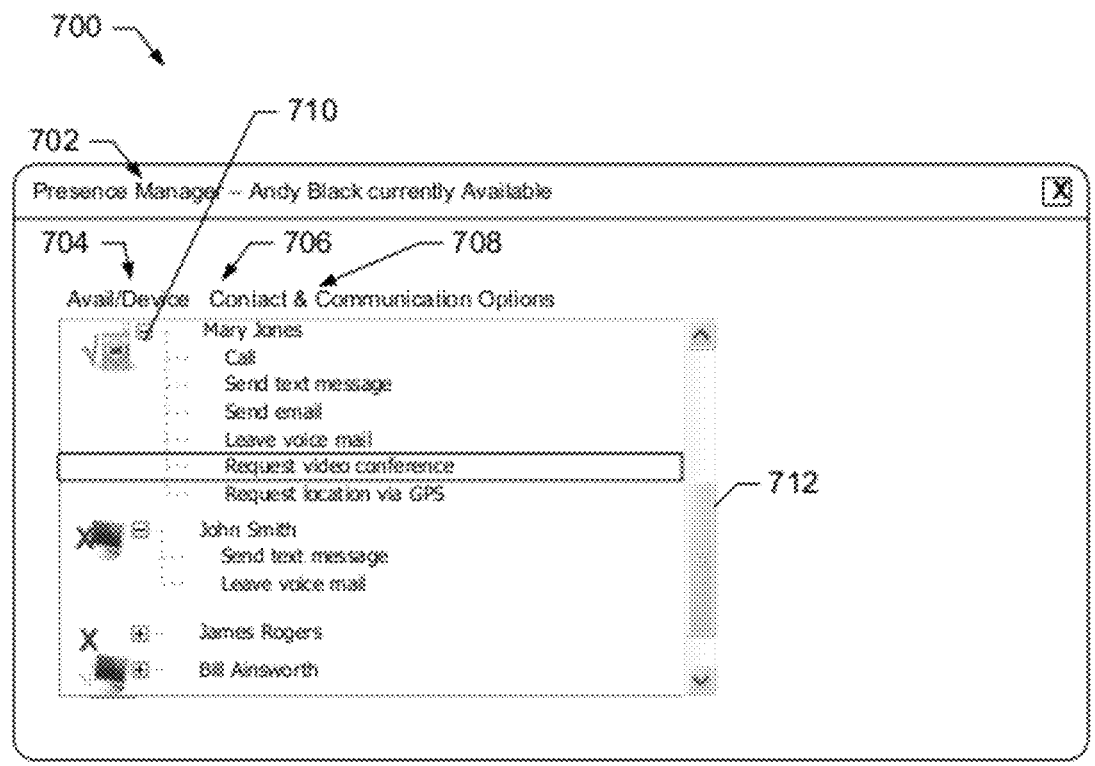
FIG. 7 is an illustration of an example user interface that may be provided to a user monitoring presence information of others.

FIG. 7 is an illustration of an example user interface 700 that may be provided to a user monitoring presence information of others. For example, the user interface may be provided to the second device 122. The example user interface includes a title bar 702, a list of devices 704, a list of contacts 706, and a list of communication methods 708.

The title bar 702 includes the name of the user (e.g., Andy Black is the name of the user of the example device) and the presence status of that user (i.e., the status that will be reported to other users monitoring the presence of the user).

The list of devices 704 provides a symbol representative of the device corresponding to the contact listed in the list of contacts 706. In the illustrated example, the contact Mary Jones is associated with a mobile telephone and the user John Smith is associated with a computer. While the example user interface includes a single device associated with each contact, each contact may alternatively be associated with multiple devices.

The list of devices 704 also includes a symbol indicating the availability of the contact (e.g., the contacts device). In the illustrated example, a checkmark indicates that the device is available for contact by the user and an "X" indicates that the device is not available for contact by the user. A device may be indicated as available when a first communication method in the list of communication methods 708 is available even though a second communication method in the list of communication methods 708 is not available (i.e., the user of the device is available whenever at least one communication method is available). Alternatively, as is illustrated in the example user interface 700, a device may be indicated as available only when the user of the device is available for live communication. In other words, the device will be listed is available when the user is present and can participate in a live communication session but will be listed as unavailable when no communication methods are available and/or when only non-realtime communication methods are available (e.g., voicemail, text messaging, etc.).

The list of communication methods 708 lists all communication methods that are available and hides communication methods that are not available. Alternatively, the list of communication methods 708 may list communication methods that are not available and display them grayed out, display them with a symbol indicating the unavailability, etc. The communication methods may be hidden using the drop down selection 710. The drop down selection 710 allows more contacts to be displayed while allowing the option of viewing the entire list of communication methods 708.

The user of the example user interface 700 can initiate a communication session using a particular method by dropping down the list of communication methods 708 using the drop down selection 710 and selecting a communication method. For example, if the user selects to video conference for a contact, a video conference session request is sent to the device associated with the contact.

The example user interface 700 includes scrollbar 712 to enable a user to view the list of available contacts 706 and the list of available communication methods 710 when the lists are longer than the available screen size.

Figure 8:
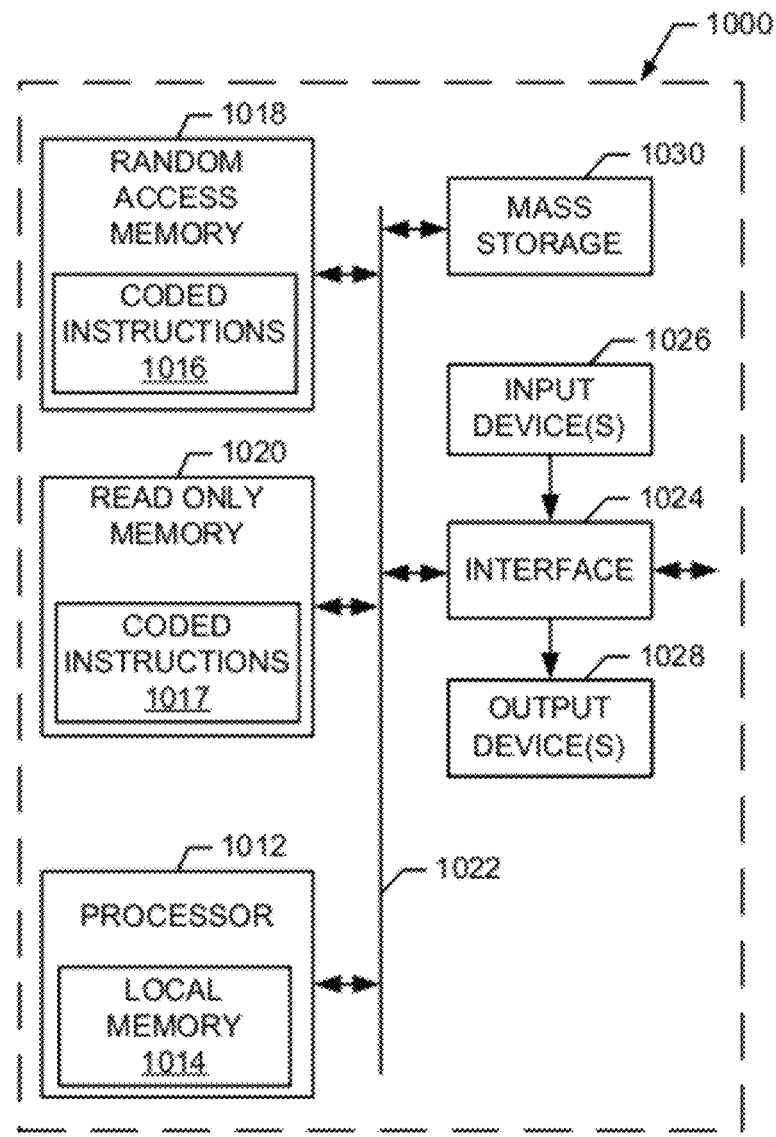
FIG. 8 is a block diagram of an example computer that may execute the machine readable instructions of FIGS. 3, 4, 5 and/or 6 to implement the example system of FIG. 1 and/or the example rich pressure server of FIGS. 1 and 2.

FIG. 8 is a block diagram of an example computer platform 1000 capable of executing the machine readable instructions illustrated in FIGS. 3, 4, 5 and/or 6 to implement the system 100, the rich presence server 116, and/or the other apparatus and/or methods disclosed herein.

The computer platform 100 of the instant example includes a processor 1012 such as a general purpose programmable processor. The processor 1012 includes a local memory 1014, and executes coded instructions 1016 present in random access memory 1018, coded instruction 1017 present in the read only memory 1020, and/or instructions present in another memory device. The processor 1012 may execute, among other things, the machine readable instructions represented in FIGS. 3, 4, 5, and/or 6. The processor 1012 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1012 is in communication with a main memory including a volatile memory 1018 and a non-volatile memory 1020 via a bus 1025. The volatile memory 1018 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown) in a conventional manner.

The computer platform 1000 also includes a conventional interface circuit 1024. The interface circuit 1024 may be implemented by any type of well known interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, isopoint and/or a voice recognition system.

One or more output devices 1028 are also connected to the interface circuit 1024. The output devices 1028 can be implemented, for example, by display devices (e.g., a liquid crystal display, a cathode ray tube display (CRT), a printer and/or speakers). The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer platform 1000 also includes one or more mass storage devices 1030 for storing software and data. Examples of such mass storage devices 1030 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for presenting presence information, the method comprising:

in response to a request from a first user for presence information associated with a second user, analyzing (a) information from a monitoring sensor that is monitoring a physical environment external to a mobile device of the second user, and (b) a user indication of availability from the second user to determine that the second user is available for communication with the first user using a first communication method supported by the mobile device and is unavailable for communication with the first user using a second communication method supported by the mobile device, the information from the monitoring sensor identifying an external environmental factor that affects a user's availability to communicate using at least one of the first communication method and the second communication method; and sending a message to the first user indicating that the second user is available for communication using the first communication method and is unavailable for communication using the second communication method.

2. A method as defined in claim 1, wherein the second communication method is an audio communication method.

3. A method as defined in claim 2, wherein the first communication method is a text communication method.

4. A method as defined in claim 1, wherein the monitoring sensor monitors a noise level.

5. A method as defined in claim 1, wherein the external environmental factor includes an ambience.

6. A method as defined in claim 1, wherein analyzing the information from the monitoring sensor to determine that the second user is available for communication using the first communication method includes determining that the second user is available for communication when the user indication of availability indicates that the second user is available and the information from the monitoring sensor indicates that the second user is available for communication using the first communication method.

7. A method as defined in claim 1, further including:
initiating a first communication session between the first user and the second user using the first communication method;
receiving a second request from a third user for presence information associated with the second user;
in response to the second request, determining that the first communication session is in progress and determining a first priority stored for the first user and a second priority stored for the second user; and
in response to determining that the first priority is lower than the second priority, sending a second message to the third user indicating that the second user is available for communication.

8. An apparatus comprising:
a memory including machine readable instructions; and
a processor to execute the instructions to:
access a request from a first user for presence information associated with a second user;
analyze (a) information from a monitoring sensor that is monitoring a physical environment external to a mobile device of the second user, and (b) a user indication of availability from the second user to determine that the second user is available for communication with the first user using a first communication method supported by the mobile device and is unavailable for communication with the first user using a second communication method supported by the mobile device, the information from the monitoring sensor identifying an external environmental factor that affects a user's availability to communicate using at least one of the first communication method and the second communication method; and
send a message to the first user indicating that the second user is available for communication using the first communication method and is unavailable for communication using the second communication method.

9. An apparatus as defined in claim 8, wherein the second communication method is an audio communication method.

10. An apparatus as defined in claim 9, wherein the first communication method is a text communication method.

11. An apparatus as defined in claim 8, wherein the monitoring sensor is to monitor a noise level.

12. An apparatus as defined in claim 8, wherein the external environmental factor includes an ambience.

13. An apparatus as defined in claim 8, wherein the processor is to execute the instructions to analyze the information from the monitoring sensor to determine that the second user is available for communication using the first communication method by determining that the second user is available for communication when the user indication of availability indicates that the second user is available and the information from the monitoring sensor indicates that the second user is available for communication using the first communication method.

14. An apparatus as defined in claim 8, wherein the processor is to execute the instructions to:
initiate a first communication session between the first user and the second user using the first communication method;
receive a second request from a third user for presence information associated with the second user;
in response to the second request, determine that the first communication session is in progress and determine a first priority stored for the first user and a second priority stored for the second user; and
in response to determining that the first priority is lower than the second priority, send a second message to the third user indicating that the second user is available for communication.

15. A tangible machine readable storage device comprising instructions which, when executed, cause a machine to perform a method comprising:
accessing a request from a first user for presence information associated with a second user;
analyzing (a) information from a monitoring sensor that is monitoring a physical environment external to a mobile device of the second user, and (b) a user indication of availability from the second user to determine that the second user is available for communication with the first user using a first communication method supported by the mobile device and is unavailable for communication with the first user using a second communication method supported by the mobile device, the information from the monitoring sensor identifying an external environmental factor that affects a user's availability to communicate using at least one of the first communication method and the second communication method; and
sending a message to the first user indicating that the second user is available for communication using the first communication method and is unavailable for communication using the second communication method.

16. A tangible machine readable storage device as defined in claim 15, wherein the second communication method is an audio communication method.

17. A tangible machine readable storage device as defined in claim 16, wherein the first communication method is a text communication method.

18. A tangible machine readable storage device as defined in claim 15, wherein the monitoring sensor monitors a noise level.

19. A tangible machine readable storage device as defined in claim 15, wherein the external environmental factor includes an ambience.

20. A tangible machine readable storage device as defined in claim 15, wherein analyzing the information from the monitoring sensor to determine that the second user is available for communication using the first communication method includes determining that the second user is available for communication when the user indication of availability indicates that the second user is available and the information from the monitoring sensor indicates that the second user is available for communication using the first communication method.

21. A tangible machine readable storage device as defined in claim 15, wherein the method includes:
 initiating a first communication session between the first user and the second user using the first communication method;
 accessing a second request from a third user for presence information associated with the second user;
 in response to the second request, determining that the first communication session is in progress and determining a first priority stored for the first user and a second priority stored for the second user; and
 in response to determining that the first priority is lower than the second priority, sending a second message to the third user indicating that the second user is available for communication.

22. A method for presenting presence information, the method comprising:
 in response to a request from a first user for presence information associated with a second user, analyzing information from a monitoring sensor that is monitoring a physical environment associated with a mobile device of the second user, and a user indication of availability from the second user to determine that the second user is available for communication with the first user using a first communication method supported by the mobile device and is unavailable for communication with the first user using a second communication method supported by the mobile device;
 sending a message to the first user indicating that the second user is available for communication using the first communication method and is unavailable for communication using the second communication method; and
 initiating a first communication session between the first user and the second user using the first communication method;
 receiving a second request from a third user for presence information associated with the second user;
 in response to the second request, determining that the first communication session is in progress and determining a first priority stored for the first user and a second priority stored for the second user; and
 in response to determining that the first priority is lower than the second priority, sending a message to the third user indicating that the second user is available for communication.

23. An apparatus comprising:
 a memory storing machine readable instructions; and
 a processor to execute the instructions to:
  in response to a request from a first user for presence information associated with a second user, analyzing\information from a monitoring sensor that is monitoring a physical environment associated with a mobile device of the second user, and\a user indication of availability from the second user to determine that the second user is available for communication with the first user using a first communication method supported by the mobile device and is unavailable for communication with the first user using a second communication method supported by the mobile device;
  sending a message to the first user indicating that the second user is available for communication using the first communication method and is unavailable for communication using the second communication method; and
  initiating a first communication session between the first user and the second user using the first communication method;
  receiving a second request from a third user for presence information associated with the second user;
  in response to the second request, determining that the first communication session is in progress and determining a first priority stored for the first user and a second priority stored for the second user; and
  in response to determining that the first priority is lower than the second priority, sending a message to the third user indicating that the second user is available for communication.

24. A tangible machine readable storage device comprising instructions which, when executed, cause a machine to perform a method comprising:
 in response to a request from a first user for presence information associated with a second user, analyzing information from a monitoring sensor that is monitoring a physical environment associated with a mobile device of the second user, and a user indication of availability from the second user to determine that the second user is available for communication with the first user using a first communication method supported by the mobile device and is unavailable for communication with the first user using a second communication method supported by the mobile device;
 sending a message to the first user indicating that the second user is available for communication using the first communication method and is unavailable for communication using the second communication method; and
 initiating a first communication session between the first user and the second user using the first communication method;
 receiving a second request from a third user for presence information associated with the second user;
 in response to the second request, determining that the first communication session is in progress and determining a first priority stored for the first user and a second priority stored for the second user; and
 in response to determining that the first priority is lower than the second priority, sending a message to the third user indicating that the second user is available for communication.

* * * * *